United States Patent
Nakamura et al.

(10) Patent No.: US 10,950,882 B2
(45) Date of Patent: Mar. 16, 2021

(54) PROTON-CONDUCTIVE MEMBRANE AND FUEL CELL

(71) Applicants: TOYOTA JIDOSHA KABUSHIKI KAISHA, Toyota (JP); NATIONAL UNIVERSITY CORPORATION NAGOYA UNIVERSITY, Nagoya (JP)

(72) Inventors: Naoki Nakamura, Shizuoka-ken (JP); Atsushi Noro, Nisshin (JP); Takato Kajita, Ichinomiya (JP); Haruka Tanaka, Nagoya (JP); Yushu Matsushita, Nagoya (JP)

(73) Assignees: TOYOTA JIDOSHA KABUSHIKI KAISHA, Toyota (JP); NATIONAL UNIVERSITY CORPORATION NAGOYA UNIVERSITY, Nagoya (JP)

( * ) Notice: Subject to any disclaimer, the term of this patent is extended or adjusted under 35 U.S.C. 154(b) by 129 days.

(21) Appl. No.: 16/256,186

(22) Filed: Jan. 24, 2019

(65) Prior Publication Data
US 2019/0245234 A1 Aug. 8, 2019

(30) Foreign Application Priority Data

Feb. 5, 2018 (JP) ............... JP2018-018359
Oct. 24, 2018 (JP) ............... JP2018-200439

(51) Int. Cl.
*H01M 8/10* (2016.01)
*H01M 8/1048* (2016.01)
*H01M 8/1069* (2016.01)
*H01M 8/1018* (2016.01)

(52) U.S. Cl.
CPC ....... *H01M 8/1048* (2013.01); *H01M 8/1069* (2013.01); *H01M 2008/1095* (2013.01); *H01M 2300/0082* (2013.01)

(58) Field of Classification Search
CPC ............. H01M 8/1048; H01M 8/1069; H01M 2008/1095; H01M 2300/0082
USPC .......................................................... 429/492
See application file for complete search history.

(56) References Cited

U.S. PATENT DOCUMENTS 7,576,165 B2 * 8/2009 Li ..................... C08F 228/02
526/258
2006/0111530 A1 * 5/2006 Li ..................... H01M 8/1039
526/258

FOREIGN PATENT DOCUMENTS

JP 2010-114020 A 5/2010

OTHER PUBLICATIONS

Sata et al. "Transport properties of anion exchange membranes prepared by the reaction of crosslinked membranes having chloromethyl groups with 4-vinylpyridine and trimethylamine", Journal of Polymer Science, Part B: Polymer Physics (1999), 37(15), 1773-1785. (Year: 1999).*

* cited by examiner

*Primary Examiner* — Michael Bernshteyn
(74) *Attorney, Agent, or Firm* — Dickinson Wright PLLC

(57) ABSTRACT

A proton-conductive membrane is provided, which exhibits high proton conductivity even in an anhydrous environment. The proton-conductive membrane includes a crosslinked polymer and a plasticizer, wherein the crosslinked polymer includes a proton acceptor group in an amount equal to not less than 10 mol % of repeating units constituting the crosslinked polymer, the plasticizer includes a proton donor compound having a pKa value of not more than 2.5, and the plasticizer is a viscoelastic solid in a temperature range of 50° C. to 120° C.

9 Claims, 4 Drawing Sheets

PROTON-CONDUCTIVE MEMBRANE AND FUEL CELL

FIELD

The present disclosure relates to a proton-conductive membrane and a fuel cell.

BACKGROUND

The use of proton-conductive membranes as the electrolyte material for fuel cells is known.

For example, Patent Literature 1 discloses:
a proton-conductive membrane comprising perfluorosulfonic acid and/or a perfluorocarboxylic acid-type resin produced by a method comprising:
a first step in which a metal salt of perfluorosulfonic acid and/or a metal salt of perfluorocarboxylic acid is dissolved in a polymer dispersion comprising a polyelectrolyte precursor that exhibits proton conductivity as a result of alkaline hydrolysis and acid treatment;
a second step in which a polymer electrolyte precursor membrane is formed from the dispersion obtained in the first step;
a third step in which the polymer electrolyte precursor membrane obtained in the second step is subjected to alkaline hydrolysis and acid treatment to form a polymer electrolyte membrane; and
a fourth step in which the polymer electrolyte membrane obtained in the third step is heated and dried to precipitate a metal oxide in the polymer electrolyte membrane.

CITATION LIST

Patent Literature

[PTL 1] Japanese Unexamined Patent Publication (Kokai) No. 2010-114020

SUMMARY

Technical Problem

In order for the proton-conductive membrane obtained by the technology of Patent Literature 1 to exhibit proton conductivity, the presence of water is indispensable. Thus, it is necessary to limit the operating temperature of a fuel cell comprising this proton-conductive membrane to below the boiling point of water.

The present disclosure aims to improve the situation described above and aims to provide a proton-conductive membrane which exhibits high proton conductivity in anhydrous environments.

Solution to Problem

The present disclosure achieves the object described above by the following means.

Aspect 1

A proton-conductive membrane, comprising: a crosslinked polymer and a plasticizer,
wherein the crosslinked polymer includes a proton acceptor group in an amount equal to 10 mol % or more of repeating units constituting the crosslinked polymer,
wherein the plasticizer includes a proton donor compound having a pKa value of 2.5 or less, and
wherein the proton-conductive membrane is a viscoelastic solid in a temperature range of 50° C. to 120° C.

Aspect 2

The proton-conductive membrane according to aspect 1, wherein when the total of the crosslinked polymer and the plasticizer is 100 parts by mass, the content of the plasticizer is 60 parts by mass to 90 parts by mass.

Aspect 3

The proton-conductive membrane according to aspect 1 or 2, wherein the proton donor compound is one or more selected from sulfuric acid and phosphoric acid.

Aspect 4

The proton-conductive membrane according to any one of aspects 1 to 3, wherein the proton acceptor group is a nitrogen-containing heterocyclic group.

Aspect 5

The proton-conductive membrane according to any one of aspects 1 to 4, wherein the glass transition point of the proton-conductive membrane is 30° C. or less.

Aspect 6

The proton-conductive membrane according to any one of aspects 1 to 5, wherein the crosslinked polymer is a copolymer of a first monomer, which is a vinyl-based monomer including a proton acceptor group, and a second monomer, which is a crosslinkable vinyl monomer.

Aspect 7

The proton-conductive membrane according to any one of aspects 1 to 6, wherein the proton conductivity of the proton-conductive membrane is 7.4 mS/cm or more at 50° C.

Aspect 8

The proton-conductive membrane according to any one of aspects 1 to 7, wherein the molar ratio of the proton donor compound to the proton acceptor group is in a range of 1.0 to 10.0.

Aspect 9

A fuel cell comprising the proton-conductive membrane according to any one of aspects 1 to 8.

Aspect 10

A method for the production of a proton-conductive membrane comprising a crosslinked polymer and a plasticizer,
wherein the crosslinked polymer includes a proton acceptor group in an amount equal to 10 mol % or more of repeating units constituting the crosslinked polymer,
wherein the plasticizer includes a proton donor compound having a pKa value of 2.5 or less, wherein the proton-conductive membrane is a viscoelastic solid in a temperature range of 50° C. to 120° C., and
wherein the method comprises: polymerizing a first monomer, which is a vinyl monomer including a proton acceptor group, to obtain a precursor polymer, then adding a crosslinking agent to the precursor polymer, and then crosslinking the precursor polymer to obtain the crosslinked polymer.

Aspect 11

A method for the production of a proton-conductive membrane comprising a crosslinked polymer and a plasticizer,
wherein the crosslinked polymer includes a proton acceptor group in an amount equal to 10 mol % or more of repeating units constituting the crosslinked polymer,
wherein the plasticizer includes a proton donor compound having a pKa value of 2.5 or less,
wherein the proton-conductive membrane is a viscoelastic solid in a temperature range of 50° C. to 120° C., and
wherein the method comprises: polymerizing and crosslinking a first monomer, which is a vinyl-based monomer including a proton acceptor group, and a second monomer, which is a crosslinkable vinyl monomer, to obtain the crosslinked polymer.

Advantageous Effects of Invention

The proton-conductive membrane of the present disclosure can exhibit a high proton conductivity even in anhydrous environments. Thus, the proton-conductive membrane of the present disclosure is particularly suitable for use as the proton-conductive membrane in a fuel cell.

DESCRIPTION OF EMBODIMENTS

Figure 1:
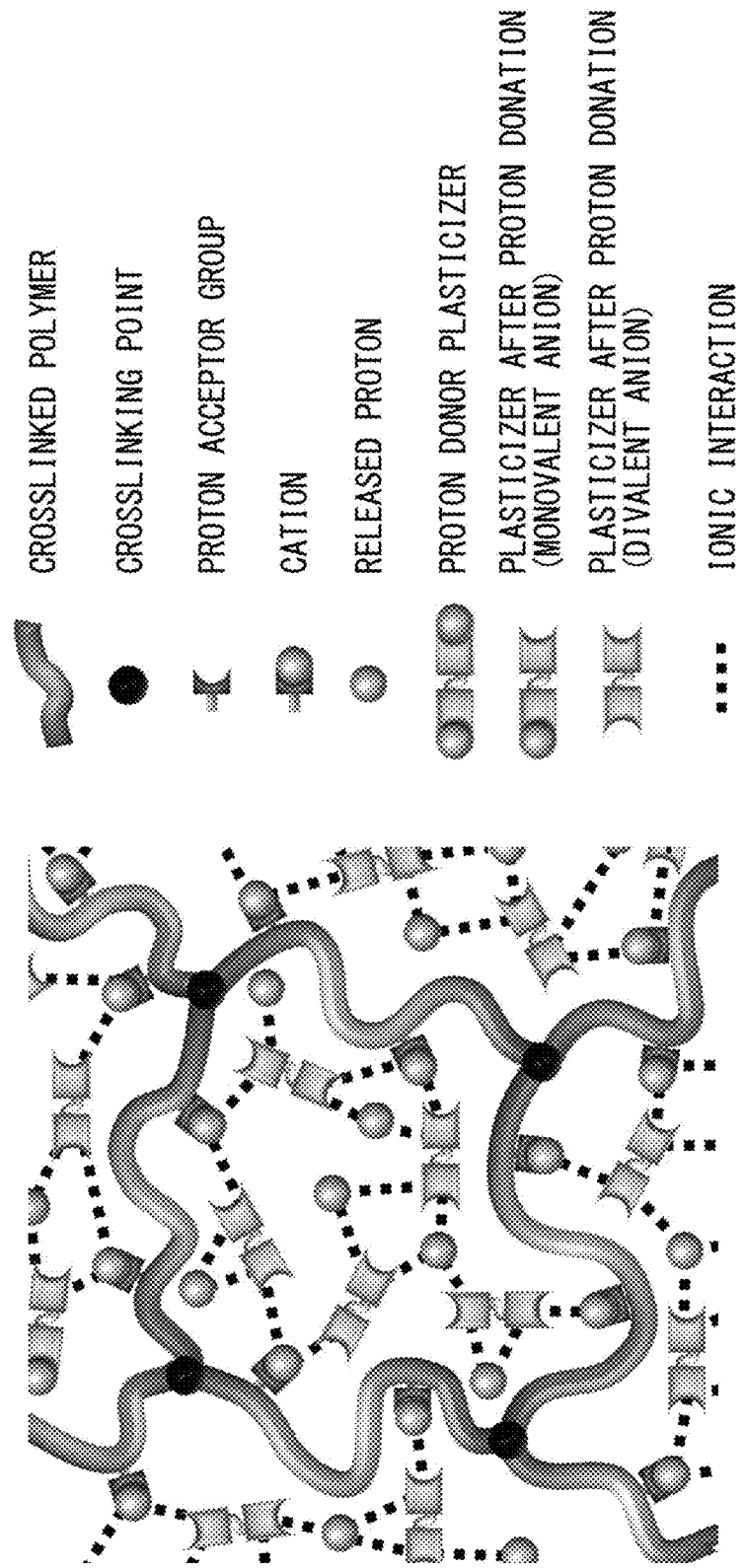
FIG. 1 is a schematic view detailing the mechanism by which the function of the proton-conductive membrane of the present disclosure is brought about.

The proton-conductive membrane of the present application comprises a crosslinked polymer and a plasticizer,
wherein the crosslinked polymer includes a proton acceptor group in an amount equal to 10 mol % or more of repeating units constituting the crosslinked polymer,
wherein the plasticizer includes a proton donor compound having a pKa value of 2.5 or less, and
wherein the proton-conductive membrane is a viscoelastic solid in a temperature range of 50° C. to 120° C.

Regarding the present disclosure, "viscoelastic solid" means a solid which has viscosity and elasticity and which does not exhibit fluidity and maintains its shape. Specifically, substances which are "viscoelastic solids" have a property wherein when a stress which causes a small deformation is applied, the stress to deformation becomes maximum immediately after deformation and decreases with the lapse of time, ultimately becoming a non-zero constant value, and when the stress is removed in the deformed state, the deformation becomes small, and in some cases, the substance returns to its original shape.

The proton-conductive membrane of the present disclosure can exhibit a high proton conductivity even in an anhydrous environment. It is believed that the high proton conductivity of the proton-conductive membrane of the present disclosure is obtained due to the movement of the protons provided by the proton donor compound as a plasticizer through the proton acceptor groups of the crosslinked polymer.

Furthermore, in the proton-conductive membrane of the present disclosure, it is believed that since the proton donor compound, which is a plasticizer, donates a proton and anionizes, and the proton acceptor group of the crosslinked polymer accepts the proton and cationizes, the proton donor compound, which is a plasticizer, remains in the crosslinked polymer due to the electrostatic interaction therebetween, whereby the viscoelastic solid state as a whole can be maintained. It is believed that such a viscoelastic solid promotes molecular motion within the proton-conductive membrane, whereby proton conductivity is promoted.

On the other hand, it is believed that the maintenance of the membrane form of the proton-conductive membrane of the present disclosure is due to the contribution of the crosslinked structure of the polymer. In other words, it is believed that the crosslinked polymer maintains the membrane form as a result of the crosslinked structure thereof.

Maintenance of the membrane form of the proton-conductive membrane means that, for example, when left standing for 1 hour in an unloaded state in the operation temperature range of a battery (for example, the range of 50° C. to 120° C., in particular, the range of 40° C. to 200° C., or the range of 0° C. to 150° C.), the proton-conductive membrane does not substantially deform and shrink, e.g., the rate of change in length in the planar direction and the thickness direction of proton-conductive membrane is, for example, 5% or less, 3% or less, or 1% or less.

FIG. 1 is a schematic view detailing the mechanism by which the function of the proton-conductive membrane of the present disclosure is brought about.

The proton-conductive membrane of FIG. 1 is composed of a "crosslinked polymer" comprising a "proton acceptor group" and a "plasticizer", which is a proton donor compound. The "crosslinked polymer" crosslinks at "crosslinking points" to form a crosslinked structure. As a result, the proton-conductive membrane of the present disclosure can maintain a membrane shape. The "plasticizer" in FIG. 1 is depicted as a proton donor dibasic acid.

The proton donor group of the "plasticizer" releases one or two protons to form a "monovalent anion" or a "divalent anion", The released protons are accepted by the "proton acceptor group" of the "crosslinked polymer" to form a "cation". In this state, since the plasticizer in the proton-conductive membrane of FIG. 1, which is a viscoelastic solid, can exhibit high molecular mobility, the protons can travel easily through the membrane, whereby a high proton conductivity is exhibited.

Furthermore, the "monovalent anion" or "divalent anion" after the "plasticizer" has released protons and the "cation" after the protons have been received by the "proton acceptor group" of the "crosslinked polymer" form "ionic interaction", and as a result, the "plasticizer" is retained in the membrane and leakage to the outside of the membrane is highly suppressed, whereby the membrane as a whole can maintain the viscoelastic solid state.

A preferred embodiment of the proton-conductive membrane of the present disclosure will be described below as an example.

Crosslinked Polymer

The crosslinked polymer contained in the proton-conductive membrane of the present disclosure comprises a proton acceptor group in an amount equal to 10 mol % or more of repeating units constituting the crosslinked polymer.

The proton acceptor group of the crosslinked polymer may be a nitrogen-containing heterocyclic group. The nitrogen-containing heterocyclic group may be, for example, a pyridine ring group, an imidazole ring group, a pyrazole ring group, an imidazoline ring group, an oxazole ring group, a pyrimidine ring group, a pyrazine ring group, a triazole ring group, a tetrazole ring group, or the like. Among these nitrogen-containing heterocyclic groups, a nitrogen-containing heteroaromatic ring group is preferable, and a pyridine ring group or an itnidazoline ring group is particularly preferable.

The crosslinked polymer may be, for example, poly(2-vinylpyridine), poly(4-vinylpyridine), poly(1-vinylimidazole), poly(2-methyl-1-vinylimidazole), poly(2-vinylimidazole), poly(4-vinylimidazole), poly(2-phenyl-1-vinylimidazole), poly(1-vinylcarbazole), or poly(2-(1H-imidazol-1-yl)ethyl (meth)acrylate). However, the crosslinked polymer is not limited thereto.

From the viewpoint of ensuring sufficiently high proton conductivity and suppressing leakage of plasticizer due to ionic interaction, it is preferable that the proton acceptor groups contained in the crosslinked polymer be present in an amount of 10 mol % or more of the repeating units of the crosslinked polymer.

The proportion thereof may be 15 mol % or more, 20 mol % or more, 30 mol % or more, 40 mol % or more, 50 mol % or more, 60 mol % or more, 70 mol % or more, 80 mol % or more, 90 mol % or more, 95 mol % or more, 96 mol % or more, or 97 mol % or more. Furthermore, the proportion thereof may be 99.5 mol % or less, 99 mol % or less, 98 mol % or less, 95 mol % or less, 90 mol % or less, 80 mol % or less, 70 mol % or less, 60 mol % or less, 50 mol % or less, 40 mol % or less, or 35 mol % or less.

The amount (number of moles) of proton acceptor groups per g of crosslinked polymer may be, for example, 0.1 mmol/g-polymer or more, 0.5 mmol/g-polymer or more, 1.0 mmol/g-polymer or more, 2.5 mmol/g-polymer or more, or 5.0 mmol/g-polymer or more. From the viewpoint of ease of synthesis of the crosslinked polymer and ensuring the handleability of the obtained polymer, the amount (molar number) of proton acceptor groups per g of crosslinked polymer may be, for example, 50 mmol/g-polymer or less, 40 mmol/g-polymer or less, 30 mmol/g-polymer or less, or 25 mmol/g-polymer or less.

The crosslinked polymer is mixed with the plasticizer, which is described later, and forms a proton-conductive membrane, which is a viscoelastic solid, thereby providing high molecular mobility. Thus, the glass transition point Tg of the crosslinked polymer alone may be relatively high. However, when the glass transition point of the crosslinked polymer is excessively high, there is a risk that the molecular mobility may not be sufficiently improved after mixing with the plasticizer.

Thus, the glass transition point of the crosslinked polymer may be 400° C. or lower, 350° C. or lower, 300° C. or lower, or 250° C. or lower. The crosslinked polymer may have two or more glass transition points. When the crosslinked polymer has two or more glass transition points, it is preferable that the lowest glass transition point is preferably lower than or equal to the operating temperature of the proton-conductive membrane (in the range of, for example, 50° C. or more and 150° C. or lower, preferably 120° C. or less), and may be, for example, 30° C. or lower, 20° C. or lower, 10° C. or lower, or 0° C. or lower. Since the crosslinked polymer has such a low glass transition point, at the time of operation of the obtained proton-conductive membrane, the crosslinked polymer can maintain high molecular mobility together with the plasticizer, and thus, a high proton conductivity can be obtained.

The structure of the repeating units of the crosslinked polymer may be arbitrary. For example, the repeating units of the crosslinked polymer may be derived from a vinyl-based monomer, an ether-based monomer, an ester-based monomer, an amide-based monomer, a silicone-based monomer, or the like. The production methods of each of the polymers and forming methods of the crosslinking structures are well-known. Among those described above, from the viewpoint of availability of the monomer and ease of molecular modification, the repeating units of the crosslinked polymer are preferably derived from a vinyl-based monomer.

The crosslinked polymer of the present disclosure is preferably a copolymer of a first monomer, which is a monomer comprising a proton acceptor group, and a second monomer, which is crosslinkable. The crosslinked polymer of the present application may be a copolymer further comprising a third monomer in addition to the first monomer and the second monomer. Examples of the first, second, and third monomers will be described below.

First Monomer

The first monomer is a monomer comprising a proton acceptor group, and may be, for example, a monomer comprising one or more proton acceptor groups and one or more polymerizable groups, and in particular, may be a monomer comprising a single proton acceptor group and a single polymerizable group. Furthermore, at least a part of the hydrogen in the monomer molecules may be substituted with fluorine. The first monomer of the present disclosure is preferably a vinyl-based monomer. Examples thereof are illustrated below by, for example, the type of proton acceptor group.

Vinyl monomers comprising pyridine rings: 2-vinylpyridine, 4-vinylpyridine, etc.

Vinyl monomers comprising imidazole rings: 1-vinylimidazole, 2-methyl-1-vinylimidazole, 2-vinylimidazole, 4-vinylimidazole, 2-phenyl-1-vinylimidazole, 1-vinylcarbazole, 2-(1H-imidazol-1-yl)ethyl (meth)acrylate, etc.

Vinyl monomers comprising pyrazole rings: 1-vinylpyrazole, 3-vinylpyrazole, etc.

Vinyl monomers comprising imidazoline rings: 1-vinyl-2-imidazoline, 1-vinyl-2-methylimidazoline, 2-vinyl-2-imidazoline, 2-(1H-imidazol-1-yl)ethyl (meth)acrylate, etc.

Vinyl monomers comprising oxazole rings: 2-phenyl-5-vinyloxazole, etc.

Vinyl monomers comprising pyrimidine rings: 5-vinylpyrimidine, 2,4-dichloro-6-vinylpyrimidine, etc.

Vinyl monomers comprising pyrazine rings: 2-vinylpyrazine, 2,5-dimethyl-3-vinylprazine, 2-methyl-5-vinylpyrazine, etc.

Vinyl monomers comprising triazole rings: 2,4-diamino-6-vinyltriazine, etc.

Vinyl monomers comprising tetrazole rings: 1-vinyl-1H-tetrazole, 2-vinyl-2H-tetrazole, 5-vinyl-1H-tetrazole, 1-methyl-5-vinyl-1H-tetrazole, etc.

The first monomer is particularly preferably 4-vinylpyridine or 1-vinylimidazole.

Note that in the present specification, "(meth)acrylic acid" is an expression that includes both acrylic acid and methacrylic acid. The same is true for "(meth)acrylate", "(meth)acrylamide", etc.

Second Monomer

The second monomer is a crosslinkable monomer and may be, for example a monomer comprising two or more polymerizable groups, and in particular, may be a monomer comprising two polymerizable groups. Furthermore, at least a part of the hydrogen in the monomer molecules may be substituted with fluorine. The second monomer of the present disclosure is preferably a vinyl-based monomer and may be, for example, N,N'-methylene bis(meth)acrylamide, divinylbenzene, vinyl (meth)acrylate, ally (meth)acrylate, 1,6-hexadiene, or the like.

Third Monomer

The third monomer is a monomer other than the first monomer and the second monomer, and may be, for example, a non-crosslinkable monomer comprising a single polymerizable group and which does not comprise a proton acceptor group. The third monomer of the present disclosure is preferably a vinyl-based monomer and may be, for example, a (meth)acrylic acid ester, styrene and a derivative thereof, a conjugated diene, or the like, and specifically may be, for example, methyl (meth)acrylate, ethyl (meth)acrylate, 2-(2-ethoxyethoxy)ethyl (meth)acrylate, styrene, α-methylstyrene, butadiene, isoprene, or the like.

Copolymerization Proportion of Each Monomer

The copolymerization proportion of each monomer in the crosslinked polymer of the present disclosure are arbitrary.

When the total of the monomers constituting the crosslinked polymer is 100 parts by mass, the proportion of the first monomer may be, for example, 5.0 parts by mass or more, 7.5 parts by mass or more, 10 parts by mass or more, 15 parts by mass or more, 20 parts by mass or more, 25 parts by mass or more, 30 parts by mass or more, 35 parts by mass or more, 40 parts by mass or more, 45 parts by mass or more, 50 parts by mass or more, 55 parts by mass or more, 60 parts by mass or more, 65 parts by mass or more, 70 parts by mass or more, 75 parts by mass or more, 80 parts by mass or more, 85 parts by mass or more, 90 parts by mass or more, 95 parts by mass or more, 97 parts by mass or more, 99 parts by mass or more, or 100 parts by mass.

Furthermore, from the viewpoint of achieving excellent proton conductivity and membrane shape maintainability, and good handleability, when moderately setting the degree of crosslinking and using as a proton-conductive membrane, based on the total of the first monomer and the second monomer of 100 parts by mass, the amount of the second monomer may be, for example, 0.1 parts by mass or more, 0.5 parts by mass or more, 1.0 parts by mass or more, 1.5 parts by mass or more, 2.0 parts by mass or more, or 2.5 parts by mass or more and may be, for example, 5.0 parts by mass or less, 4.5 parts by mass or less, 4.0 parts by mass or less, 3.5 parts by mass or less, 3.0 parts by mass or less, or 2.5 parts by mass or less. Note that in place of the second monomer or in addition to the second monomer, a crosslinking agent or the like may be suitably added to form crosslinks. The content of the crosslinking agent when a crosslinking agent is used in place of the second monomer and the total content when the second monomer and a crosslinking agent are used in combination are not particularly limited and may be the same as the amounts of the second monomer listed above.

Furthermore, from the viewpoint of achieving excellent proton conductivity and membrane shape maintainability, when the total of the first monomer, the second monomer, and the third monomer is 100 parts by mass, the amount of the third monomer may be, for example, 50 parts by mass or less, 40 parts by mass or less, 30 parts by mass or less, 20 parts by mass or less, 15 parts by mass or less, 10 parts by mass or less, 5 parts by mass or less, or 1 part by mass or less. Note that the third monomer may be omitted.

In the present disclosure, "parts by mass" and "mass %" merely differ in expression and are treated as synonymous unless otherwise stated. For example, the phrase "when the total is 100 parts by mass, the amount of component X is x parts by mass" and the phrase "when the total is 100 mass %, the amount of component X is x mass %" are synonymous.

Copolymerization Method

The copolymer of the first through third monomers can be obtained by a well-known polymerization method, for example, a radical polymerization method, a cationic polymerization method, an anionic polymerization method, or the like, preferably by a radical polymerization method.

Radical polymerization may be performed by contacting a predetermined monomer mixture with a radical polymerization initiator. The radical polymerization may be performed in the presence of the plasticizer, which is described later.

The radical polymerization initiator may be selected from, for example, azo compounds, hydrogen peroxide, organic peroxides, and the like. The azo compound may be selected from, for example, azobisisobutyronitrile, 1,1'-azobis(cyclohexane-1-carbonitrile), 2,2'-azobis(4-methoxy-2,4-dimethylvaleronitrile), and the like. The organic peroxide may be selected from, for example, benzoyl peroxide, diisobutyl peroxide, and the like.

The usage ratio of the radical polymerization initiator may be, for example, 0.001 parts by mass or more, 0.003 parts by mass or more, 0.005 parts by mass or more, 0.01 parts by mass or more, or 0.05 parts by mass or more per 100 parts by mass of the total monomers, and may be 3.0 parts by mass or less, 2.0 parts by mass or less, 1.0 parts by mass or less, 0.5 parts by mass or less, or 0.1 parts by mass or less per 100 parts by mass of the total monomers.

The radical polymerization may be performed in the absence of a solvent or may be performed in a suitable solvent.

The radical polymerization may be performed at a temperature of, for example, 40° C. or more, 50° C. or more, 60° C. or more, or 70° C. or more, and, for example, 200° C. or lower, 150° C. or lower, 120° C. or lower, or 100° C. or lower, for a period of, for example, 30 minutes or more, one hour or more, two hours or more, or three hours or more, and, for example, 10 hours or less, 8 hours or less, 5 hours or less, or 3 hours or less.

After polymerization, in order to remove unreacted monomers, low molecular weight oligomers, radical initiator residue and the like, the obtained polymer may be purified by an appropriate method. The purification method may be, for example, solvent substitution, reprecipitation or the like.

Plasticizer

The plasticizer contained in the proton-conductive membrane of the present disclosure comprises a proton donor compound having a pKa value of 2.5 or less, 2.3 or less, 2.1 or less, 2.0 or less, 1.0 or less, 0.0 or less, −1.0 or less, or −2.0 or less. Thus, the plasticizer comprises a proton donor compound having a high acidity, i.e., comprises a compound having a high tendency to release protons. Note that when the proton donor compound is a polybasic acid, pKa means $pKa_1$.

The proton donor compound may be a compound comprising one or more groups selected from a sulfonic acid group and a phosphate group. Note that the pKa value of the sulfonic acid group is about −3.0 and the pKa ($pKa_1$) value of the phosphate group is about 2.1.

The proton donor compound preferably has a boiling point or decomposition temperature which is high enough that the proton donor compound does not evaporate or decompose at the operating temperature of the proton-conductive membrane. From this viewpoint, the boiling point or decomposition temperature of the proton donor compound may be, for example, more than 120° C., 150° C. or more, or 200° C. or more.

The proton donor compound may be one or more selected from sulfuric acid and phosphoric acid, or may be sulfuric acid or phosphoric acid. Note that the boiling point of sulfuric acid is about 290° C. (decomposition) and the boiling point of phosphoric acid is about 213° C. (decomposition).

The plasticizer may be composed of only the proton donor compound or may be comprised of the proton donor compound and another plasticizer. The other plasticizer may be a plasticizer which does not have a proton donor property, and may specifically be, for example, polyalkylene glycol, polyvinyl ether, polyol ester, or the like. The usage ratio of the other plasticizer, when the total mass of the plasticizer is 100 parts by mass, may be, for example, 50 parts by mass or less, 30 parts by mass or less, 10 parts by mass or less, 5 parts by mass or less, or 1 part by mass or less. The other plasticizer may not be used at all.

Note that in the present description, "alkylene group" is a concept encompassing methylene groups, alkyl methylene groups, and dialkyl methylene groups.

Molar Ratio of Proton Donor Compound to Proton Acceptor Group

The molar ratio of the proton donor compound to the proton acceptor group (proton donor compound/proton acceptor group) is not particularly limited, and from the viewpoint of ensuring the function of the proton donor compound as a plasticizer, may be, for example, 1.0 or more, 1.1 or more, 1.3 or more, 1.4 or more, 1.5 or more, 1.6 or more, 1.7 or more, 1.8 or more, 1.9 or more, 2.0 or more, 2.1 or more, 2.2 or more, 2.3 or more, 2.4 or more, 2.5 or more, 2.6 or more, 2.7 or more, 2.8 or more, 2.9 or more, 3.0 or more, 3.1 or more, 3.4 or more, 3.5 or more, 3.6 or more, 3.7 or more, 3.8 or more, 3.9 or more, 4.0 or more, 4.1 or more, 4.2 or more, or 4.3 or more. Furthermore, the upper limit of this molar ratio is not particularly limited and from the viewpoint of maintaining membrane strength and ensuring stability as a membrane, may be, for example, 10.0 or less, 9.0 or less, 8.5 or less, 8.0 or less, 7.5 or less, 7.0 or less, 6.5 or less, 6.0 or less, 5.5 or less, 5.0 or less, 4.5 or less, 4.4 or less, or 4.3 or less.

Proportion of Crosslinked Polymer and Plasticizer

From the viewpoint of increasing the molecular mobility of the obtained proton-conductive membrane and obtaining sufficiently high proton conductivity, the usage ratio of the crosslinked polymer and the plasticizer may be, as the usage ratio of the plasticizer to 100 parts by mass of the total of the crosslinked polymer and the plasticizer, 60 parts by mass or more, 65 parts by mass or more, 70 parts by mass or more, 75 parts by mass or more, or 80 parts by mass or more. Conversely, from the viewpoint of maintaining membrane strength and ensuring stability as a membrane, the usage ratio of the plasticizer to 100 parts by mass of the total of the crosslinked polymer and the plasticizer may be, 90 parts by mass or less, 85 parts by mass or less, 82 parts by mass or less, 80 parts by mass or less, 75 parts by mass or less, 70 parts by mass or less, or 65 parts by mass or less.

Glass Transition Point, Proton Conductivity, and Water Content of Proton-Conductive Membrane Glass Transition Point The whole of the proton-conductive membrane of the present disclosure exhibits high molecular mobility as a membrane due to the inclusion of the crosslinked polymer and the plasticizer. High molecular mobility of the proton-conductive membrane can be determined by a low glass transition point Tg.

In addition to the high molecular mobility of the introduced plasticizer itself, the proton-conductive membrane of the present disclosure as a membrane can maintain molecular mobility even at low temperatures due to the low glass transition point Tg thereof, and thus, a high proton conductivity can be obtained. The glass transition point Tg of the proton-conductive membrane is preferably lower than or equal to the lower limit value of the operating temperature of the proton-conductive membrane and may be, for example 0° C. or lower, −20° C. or lower, −40° C. or lower, −60° C. or lower, or −65° C. or lower.

Note that in the present description, the glass transition point Tg is a value obtained based on the DSC curve obtained by measuring at a heating rate of 10° C./min in accordance with JIS K7121.

Proton Conductivity

The proton-conductive membrane of the present disclosure exhibits a high proton conductivity. The proton conductivity of the proton-conductive membrane of the present disclosure may be 7.4 mS/cm or more at 50° C. This value may be, for example, 10 mS/cm or more, 15 mS/cm or more, 30 mS/cm or more, 50 mS/cm or more, 75 mS/cm or more, 100 mS/cm or more, or 120 mS/cm or more. Furthermore, the proton conductivity of the proton-conductive membrane of the present disclosure may be, at 120° C., for example, 19 mS/cm or more, 20 mS/cm or more, 30 mS/cm or more, 50 mS/cm or more, 75 mS/cm or more, 100 mS/cm or more, 125 mS/cm or more, 150 mS/cm or more, 175 mS/cm or more, 200 mS/cm or more, or 210 mS/cm or more.

Water Content

The proton-conductive membrane of the present disclosure exhibits a high proton conductivity even in the case in which water is not included in the membrane. Thus, the water content of the proton-conductive membrane of the present disclosure may be, when the total mass of the membrane is 100 parts by mass, for example, 1 part by mass or less, 0.1 parts by mass or less, 0.01 parts by mass or less, or 0.001 parts by mass or less.

Proton-Conductive Membrane Production Method

The present disclosure provides, as the method for producing a proton-conductive membrane comprising the aforementioned crosslinked polymer and plasticizer, a first production method and a second production method. The proton-conductive membrane of the present disclosure can be produced using either method. These production methods will be described below. Note that for each production method, redundant descriptions have been omitted for parts that can be shared with the "proton-conductive membrane" described above.

First Production Method

The first production method of the present disclosure provides:
a method for the production of a proton-conductive membrane comprising a crosslinked polymer and a plasticizer,
wherein the crosslinked polymer includes a proton acceptor group in an amount equal to 10 mol % or more of repeating units constituting the crosslinked polymer,
wherein the plasticizer includes a proton donor compound having a pKa value of 2.5 or less,
wherein the proton-conductive membrane is a viscoelastic solid in a temperature range of 50° C. to 120° C., and
wherein the first production method comprises: polymerizing a first monomer, which is a vinyl monomer including a proton acceptor group, to obtain a precursor polymer, then adding a crosslinking agent to the precursor polymer, and then crosslinking the precursor polymer to obtain the crosslinked polymer.

The method for polymerizing the first monomer is not particularly limited and may be, for example, radical polymerization using a RAFT agent (reversible addition-fragmentation chain-transfer agent). Note that the conditions for radical polymerization, the radical polymerization initiator, and the details of the first monomer are as described above, and accordingly, explanation therefor has been omitted.

Examples of the RAFT agent include thiocarbonylthio compounds such as dithioesters, dithiocarbamates, trithiocarbonates, and xanthates. Specific examples of the RAFT agent include bis(n-octylmercapto-thiocarbonyl)disulfide, 4-cyano-4-[(dodecylsulfanylthiocarbonyl) sulfanyl]pentanoic acid, 2-(dodecylthiocarbonothioylthio)-2-methylpropionic acid, S,S'-bis($\alpha,\alpha$'-dimethyl-$\alpha$"-acetic acid)trithiocarbonate, 2-cyano-2-propyldodecyl trithiocarbonate, 4-cyano-4-(phenylcarbonothioylthio) pentanoic acid, cyanomethyldodecyl trithiocarbonate, or 2-cyano-2-propylbenzodithionate. However, the RAFT agent is not limited thereto.

The content of the RAFT agent may be, per 100 mol of the first monomer, for example, 0.001 mol or more, 0.005 mol or more, 0.010 mol or more, 0.015 mol or more, 0.020 mol or more, 0.025 mol or more, 0.030 mol or more, 0.035 mol or more, 0.040 mol or more, 0.045 mol or more, 0.050 mol or more, 0.055 mol or more, 0.060 mol or more, 0.065 mol or more, 0.070 mol or more, 0.075 mol or more, 0.080 mol or more, 0.085 mol or more, 0.090 mol or more, or 0.095 mol or more, and may be 0.50 mol or less, 0.40 mol or less, 0.30 mol or less, 0.20 mol or less, 0.10 mol or less, or 0.095 mol or less.

Further, the crosslinked polymer can be obtained by adding a crosslinking agent to a precursor polymer obtained by polymerizing the first monomer, and crosslinking the precursor polymer.

The crosslinking agent is not particularly limited and may be, for example, a dihalogenated hydrocarbon such as 1,2-dichloroethane, 1,2-dibromoethane, 1,3-dichloropropane, 1,3-dibromopropane, 1,4-dichlorobutane, 1,4-dibromobutane, 1,4-dichloro-2-butene, or 3,4-dichloro-1-butene. However, the crosslinking agent is not limited thereto.

When crosslinking the precursor polymer, a solvent may be suitably added. From the viewpoint of simplifying post-treatment, it is preferable to add an evaporable solvent such as, for example, methanol or ethanol.

The temperature when crosslinking is not particularly limited and may be room temperature or heating may be appropriately performed. Furthermore, the duration of crosslinking is not particularly limited and may be several minutes to several days. Furthermore, when an evaporable solvent is used, the crosslinking reaction can also proceed while evaporating the solvent.

Second Production Method

The second production method of the present disclosure provides:
a method for the production of a proton-conductive membrane comprising a crosslinked polymer and a plasticizer,
wherein the crosslinked polymer includes a proton acceptor group in an amount equal to 10 mol % or more of repeating units constituting the crosslinked polymer,
wherein the plasticizer includes a proton donor compound having a pKa value of 2.5 or less, and
wherein the proton-conductive membrane is a viscoelastic solid in a temperature range of 50° C. to 120° C., and
wherein the second production method comprises: polymerizing and crosslinking a first monomer, which is a vinyl-based monomer including a proton acceptor group, and a second monomer, which is a crosslinkable vinyl monomer, to obtain the crosslinked polymer.

The "copolymerization method" described above can be appropriately used as the method for polymerizing and crosslinking the first monomer and the second monomer. Furthermore, the third monomer described above may be used as necessary.

The proton-conductive membrane of the present disclosure can be produced by introducing a plasticizer into the crosslinked polymer obtained by the above first production method or second production method. Introduction of the plasticizer into the crosslinked polymer can be carried out in a volatile solvent.

The solvent to be used can be selected from polar solvents which have a high affinity with the crosslinked polymer and the plasticizer and which are stable in strong acids, and may specifically be, for example, alcohols or ethers. The alcohol may be, for example, methanol or ethanol. The ether may be, for example, dimethyl ether, diethyl ether, or tetrahydrofuran. The usage amount of the solvent may be, per 100 parts by mass of total of the crosslinked polymer and the plasticizer, for example, 500 parts by mass or more, 750 parts by mass or more, 1,000 parts by mass or more, 1,250 parts by mass or more, or 1,500 parts by mass or more, and may be, for example, 5,000 parts by mass or less, 4,500 parts by mass or less, 4,000 parts by mass or less, 3,500 parts by mass or less, or 3,000 parts by mass or less.

The proton-conductive membrane of the present disclosure is obtained by removing the solvent after the crosslinked polymer has been immersed in a solution in which the plasticizer has been dissolved in a solvent.

The formation of the proton-conductive membrane into a membrane shape may be appropriately carried out by a method such as a casting method or a pressing method, after the plasticizer has been introduced into the crosslinked polymer and prior to removal of the solvent.

Fuel Cell

The fuel cell of the present disclosure comprises the proton-conductive membrane of the present disclosure. In particular, the fuel cell of the present disclosure comprises a laminate comprising a fuel electrode side separator having a fuel flow path, a fuel electrode side catalyst layer, the proton-conductive membrane of the present disclosure, an air electrode side catalyst layer, and an air electrode side separator having an air flow path laminated in this order. More specifically, the fuel cell of the present disclosure comprises a laminate comprising a fuel electrode side separator having a fuel flow path, a fuel electrode side gas diffusion layer, a fuel electrode side catalyst layer, the proton-conductive membrane of the present disclosure, the air electrode side catalyst layer, the air electrode side gas diffusion layer, and the air electrode side separator having an air flow path laminated in this order.

EXAMPLES

The present disclosure will be described in detail below by way of the Examples. The following Examples do not limit the applications of the present disclosure in any way.

Polymer Synthesis

Synthesis Example 1: Synthesis of Crosslinked P4VP

In the present Synthesis Example, a crosslinked polymer comprising repeating units of pyridyl groups as proton acceptor groups was synthesized as described below.

Unpurified 4-vinylpyridine was passed through a column loaded with basic alumina and purified.

2.00 g (19.0 mmol) of the purified 4-vinylpyridine (4VP) as the first monomer comprising a proton acceptor group, 50.3 mg (0.326 mmol) of N,N'-methylene bisacrylamide (MBAA) as the crosslinkable second monomer, and 2.0 mg (0.012 mmol) of azobisisobutyronitrile (AIBN) as the radical polymerization initiator were mixed in a sample bottle to obtain a raw material solution. The mass ratio of the first monomer:the second monomer:the radical polymerization initiator in the raw material solution was about 1000:25:1. Furthermore, the molar ratio of the first monomer:the second monomer:the radical polymerization initiator in the raw material solution was about 1583:27:1. If polymerization progressed in accordance with the monomer charge ratio, the proportion of the first monomer comprising a pyridyl group as the proton acceptor group among the repeating units of the obtained crosslinked polymer should have been about 97.6 mass % ($\approx$1000/(1000+25)). These values are summarized in Table 1 below.

After bubbling the raw material solution with nitrogen gas for 45 minutes, the temperature of the raw material solution was raised to 70° C. under atmospheric pressure by an oil bath and the polymerization reaction was carried out for 3.5 hours while stirring at 500 rpm. After completion of the reaction, the sample bottle was removed from the oil bath and allowed to stand on a 50° C. hot plate for 2 days. After 2 days had elapsed, it was confirmed that the sample in the sample bottle had become glassy.

40 ml of methanol was added to the sample in the sample bottle and the sample was immersed therein for 1 hour. 1 hour later, the methanol was removed, the same amount of new methanol was added thereto, and immersion was again performed for 1 hour. This methanol immersion operation was repeated three times, and unreacted monomers, low molecular weight oligomers, etc., were removed to purify the sample. Next, after standing for 1 day on a hot plate at 50° C., the sample was dried in a vacuum dryer at 50° C. for 12 hours to completely remove the methanol, whereby crosslinked poly(4-vinylpyridine) (crosslinked P4VP) was obtained.

The structure of the obtained crosslinked P4VP is shown below.

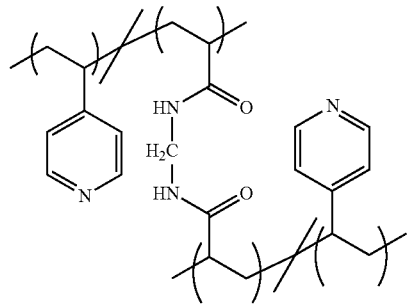

[Chem. 1]

Synthesis Example 2 (Comparative Synthesis Example): Synthesis of Non-Crosslinked P4VP In the present Synthesis Example, a non-crosslinked polymer comprising repeating units of pyridyl groups as the proton acceptor group was synthesized as described below.

Unpurified 4-vinylpyridine was passed through a column loaded with basic alumina and purified.

40 ml (376 mmol) of the 4-vinylpyridine (4VP) as the first monomer comprising a proton acceptor group, 101 mg (0.358 mmol) of S,S'-bis($\alpha,\alpha'$-dimethyl-$\alpha''$-acetic acid)trithiocarbonate as the reversible addition-fragmentation chain-transfer agent (RAFT agent), and 29.4 mg (0.179 mmol) of azobisisobutyronitrile (AIBN) as the radical polymerization initiator were mixed in an eggplant flask to obtain a raw material solution. The molar ratio of the first monomer:the RAFT agent:the radical polymerization initiator in the raw material solution was about 2100:2:1. If polymerization progressed in accordance with the monomer charge ratio, the proportion of the first monomer comprising a pyridyl group as the proton acceptor group among the repeating units of the obtained non-crosslinked polymer should have been about 100 mass %.

After bubbling the raw material solution with nitrogen gas for 45 minutes, the temperature of the raw material solution was raised to 80° C. under atmospheric pressure by an oil bath and the polymerization reaction was carried out for 1.5 hours while stirring at 500 rpm. After completion of the reaction, the eggplant flask was immersed in liquid nitrogen to stop the polymerization.

The average degree of polymerization of the non-crosslinked 4VP was evaluated using the sample in the eggplant flask after the polymerization was stopped. Specifically, a part of the sample in the eggplant flask was taken, dissolved in deuterochloroform, measured by $^1$H-NMR, and the conversion of non-crosslinked 4VP was estimated to obtain the average degree of polymerization. As a result, the conversion rate of the non-crosslinked 4VP was 38%, and the average degree of polymerization was 399.

Reprecipitation purification was carried out for the sample in the eggplant flask after polymerization was stopped. Specifically, reprecipitation purification was performed in the following manner.

Chloroform was added to the sample to prepare a polymer solution having a concentration of 8 mass %. This polymer solution was added dropwise into a large excess of n-hexane to precipitate solid non-crosslinked poly(4-vinylpyridine) (non-crosslinked P4VP). The obtained solid polymer was separated by suction filtration and then sufficiently dried by vacuum drying. The non-crosslinked P4VP after drying was again dissolved in chloroform and added dropwise into n-hexane to precipitate solid non-crosslinked P4VP. The precipitation operation of non-crosslinked P4VP was carried out three times in total to remove unreacted monomers, low molecular weight oligomers, etc. Thereafter, the sample was sufficiently dried by vacuum drying, and purified non-crosslinked P4VP was obtained.

The molecular weight distribution (Mw/Mn) of the obtained purified non-crosslinked P4VP measured by gel permeation chromatography (GPC) under the following conditions was 1.3.
Solvent, eluent: N,N-dimethylformamide (DMF)
Polymer concentration: 0.5 mass %
Eluent flow rate: 1 mL/min
Columns: Three "TSK-GEL column 4000 HHR" columns manufactured by Tosoh Corporation were connected.

The obtained non-crosslinked P4VP had the structure shown below.

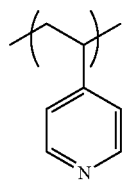

[Chem. 2]

Synthesis Example 3: Synthesis of Crosslinked PVIm

In the present Synthesis Example, a crosslinked polymer comprising repeating units of imidazolyl groups as the proton acceptor group was synthesized as described below.

Unpurified 1-vinylimidazol was passed through a column loaded with basic alumina and purified.

2.01 g (21.4 mmol) of the purified 1-vinylimidazole (VIm) as the first monomer comprising a proton acceptor group, 50.1 mg (0.325 mmol) of N,N'-methylene bisacrylamide (MBAA) as the crosslinkable second monomer, and 2.3 mg (0.014 mmol) of azobisisobutyronitrile (AIBN) as the radical polymerization initiator were mixed in a sample bottle to obtain a raw material solution. The mass ratio of the first monomer:the second monomer:the radical polymerization initiator in the raw material solution was about 1000:25:1. Furthermore, the molar ratio of the first monomer:the second monomer:the radical polymerization initiator in the raw material solution was about 1528:23:1. If polymerization progressed in accordance with the monomer charge ratio, the proportion of the first monomer comprising an imidazolyl group as the proton acceptor group among the repeating units of the obtained crosslinked polymer should have been about 97.6 mass % (≈1000/(1000+25)). These values are summarized in Table 1 below.

After bubbling the raw material solution with nitrogen gas for 40 minutes, the temperature of the raw material solution was raised to 80° C. under atmospheric pressure by an oil bath and the polymerization reaction was carried out for 4 hours while stirring at 500 rpm. After completion of the reaction, the sample bottle was removed from the oil bath and allowed to stand on a 50° C. hot plate for 2 days. After 2 days had elapsed, it was confirmed that the sample in the sample bottle had become glassy.

40 ml of methanol was added to the sample in the sample bottle and the sample was immersed therein for 1 hour. 1 hour later, the methanol was removed, the same amount of new methanol was added thereto, and immersion was again performed for 1 hour. This methanol immersion operation was repeated three times, and unreacted monomer, low molecular weight oligomers, etc., were removed to purify the sample. Next, after standing for 1 day on a hot plate at 50° C., the sample was dried in a vacuum dryer at 50° C. for 2 days to completely remove the methanol, whereby crosslinked poly(1-vinylimidazol) (crosslinked PVIm) was obtained.

The structure of the obtained crosslinked PVIm is shown below.

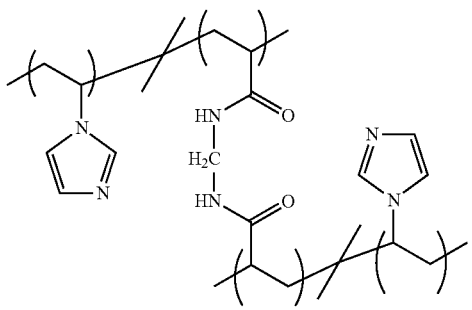

[Chem. 3]

Synthesis Example 4: Synthesis of Crosslinked P(4VP-co-S)

In the present Synthesis Example, a crosslinked polymer comprising repeating units of pyridyl groups as the proton acceptor group was synthesized as described below.

Unpurified 4-vinylpyridine was passed through a column loaded with basic alumina and purified. Styrene was purified in the same manner.

0.663 g (6.31 mmol) of the purified 4-vinylpyridine (4VP) as the first monomer comprising a proton acceptor group, 25.3 mg (0.164 mmol) of N,N'-methylene bisacrylamide (MBAA) as the crosslinkable second monomer, 0.332 g (3.19 mmol) of styrene (S) as the non-crosslinkable third monomer having no proton acceptor groups, and 1.1 mg (0.0067 mmol) of azobisisobutyronitrile (AIBN) as the radical polymerization initiator were mixed in a sample bottle to obtain a raw material solution. The mass ratio of the first monomer:the second monomer:the third monomer:the radical polymerization initiator in the raw material solution was about 600:23:300:1. Furthermore, the molar ratio of the first monomer:the second monomer:the third monomer:the radical polymerization initiator in the raw material solution was about 942:24:476:1. If polymerization progressed in accordance with the monomer charge ratio, the proportion of the first monomer comprising a pyridyl group as the proton acceptor group among the repeating units of the obtained crosslinked polymer should have been about 65.0 mass % (≈600/(600+23±300)). These values are summarized in Table 1 below.

After bubbling the raw material solution with nitrogen gas for 30 minutes, the temperature of the raw material solution was raised to 80° C. under atmospheric pressure by an oil bath and the polymerization reaction was carried out for 7.5 hours while stirring at 500 rpm. Thereafter, the sample bottle was removed from the oil bath and it was confirmed that the sample in the sample bottle had become glassy.

40 ml of chloroform was added to the sample in the sample bottle and the sample was immersed therein for 2.5 hours. 2.5 hours later, the chloroform was removed, the same amount of new chloroform was added thereto, and immersion was again performed for 2.5 hours. This chloroform immersion operation was repeated three times, and unreacted monomers, low molecular weight oligomers, etc., were removed to purify the sample. Since the obtained sample was swollen with chloroform, the sample was allowed to stand on a hot plate at 50° C. for about 12 hours in order to remove the chloroform, and thereafter, the sample was dried in a vacuum dryer at 50° C. for 1 week to completely remove the chloroform, which is a volatile solvent, whereby crosslinked poly(4-vinylpyridine-co-styrene) (crosslinked P(4VP-co-S)) was obtained.

The structure of the obtained crosslinked P(4VP-co-S) is shown below.

[Chem. 4]

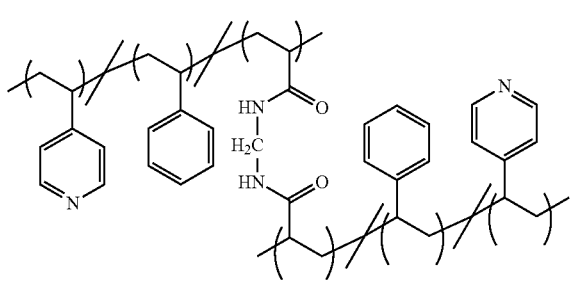

Crosslinked P (4VP-co-S)

Synthesis Example 5: Synthesis of Crosslinked P(4VP-co-S)

In the present Synthesis Example, a crosslinked polymer comprising repeating units of pyridyl groups as the proton acceptor group was synthesized as described below.

The present Synthesis Example was the same as Synthesis Example 4 except that the mass ratio of the first monomer: the second monomer:the third monomer:the radical polymerization initiator in the raw material solution was about 420:21:410:1, whereby crosslinked poly(4-vinylpyridine-co-styrene) (crosslinked P(4VP-co-S)) was obtained. If polymerization progressed in accordance with the monomer charge ratio, the proportion of the first monomer comprising a pyridyl group as the proton acceptor group among the repeating units of the obtained crosslinked polymer should have been about 49.4 mass % (≈420/(420+21+410)). These values are summarized in Table 1 below.

Synthesis Example 6: Synthesis of Crosslinked P(4VP-co-S)

In the present Synthesis Example, a crosslinked polymer comprising repeating units of pyridyl groups as the proton acceptor group was synthesized as described below.

The present Synthesis Example is the same as Synthesis Example 4 except that the mass ratio of the first monomer: the second monomer:the third monomer:the radical polymerization initiator in the raw material solution was about 340:25:680:1, whereby crosslinked poly(4-vinylpyridine-co-styrene) (crosslinked P(4VP-co-S) was obtained. If polymerization progressed in accordance with the monomer charge ratio, the proportion of the first monomer comprising a pyridyl group as the proton acceptor group among the repeating units of the obtained crosslinked polymer should have been about 32.5 mass % (≈340/(340+25+680)). These values are summarized in Table 1 below.

Synthesis Example 7 (Comparative Synthesis Example): Synthesis of Crosslinked PS In the present Synthesis Example, a crosslinked polymer which does not substantially comprise repeating units as the proton acceptor group was synthesized.

Unpurified styrene was passed through a column loaded with basic alumina and purified.

24.8 mg (0.161 mmol) of N,N'-methylene bisacrylamide (MBAA) as the crosslinkable second monomer, 1.01 g (9.71 mmol) of styrene (S) as the non-crosslinkable third monomer having no proton acceptor groups, 1.1 mg (0.0067 mmol) of azobisisobutyronitrile (AIBN) as the radical polymerization initiator, and 0.100 g of methanol as a solvent were mixed in a sample bottle to obtain a raw material solution. The mass ratio of the second monomer:the third monomer:the radical polymerization initiator in the raw material solution was about 23:920:1. Furthermore, the molar ratio of the second monomer:the third monomer:the radical polymerization initiator in the raw material solution was about 24:1449:1. If polymerization progressed in accordance with the monomer charge ratio, the proportion of the first monomer as the proton acceptor group among the repeating units of the obtained crosslinked polymer should have been 0 mass % (=0/(23+920)). These values are summarized in Table 1 below.

After bubbling the raw material solution with nitrogen gas for 30 minutes, the temperature of the raw material solution was raised to 80° C. under atmospheric pressure by an oil bath and the polymerization reaction was carried out for 7.5 hours while stirring at 500 rpm. Thereafter, the sample bottle was removed from the oil bath and it was confirmed that the sample in the sample bottle had become glassy.

40 ml of tetrahydrofuran (THF) was added to the sample in the sample bottle and the sample was immersed therein for 2.5 hours. 2.5 hours later, the THF was removed, the same amount of new THF was added thereto, and immersion was again performed for 2.5 hours. This THF immersion operation was repeated three times, and unreacted monomers, low molecular weight oligomers, etc., were removed to purify the sample. Since the sample was swollen with THF, the sample was allowed to stand on a hot plate at 50° C. for about 12 hours in order to remove the THF, and thereafter, the sample was dried in a vacuum dryer at 50° C. for 1 week to completely remove the THF, which is a volatile solvent, whereby crosslinked polystyrene (crosslinked PS) was obtained.

The structure of the obtained crosslinked PS is shown below.

[Chem. 5]

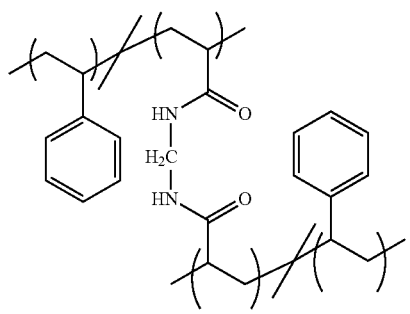

Crosslinked PS

Synthesis Example 8: Synthesis of Post-Crosslinked P4VP

In the present Synthesis Example, a post-crosslinked polymer comprising repeating units of pyridyl groups as the proton acceptor groups was synthesized as described below by reacting the non-crosslinked polymer (non-crosslinked P4VP) comprising pyridyl groups obtained in Synthesis Example 2 with a crosslinking agent.

More specifically, 1.01 g of the non-crosslinked P4VP obtained in Synthesis Example 2 above was dissolved in 9.94 g of a methanol solvent. 0.0101 g of 1,4-dibromobutane as a crosslinking agent was added to this solution, and after thorough mixing, the mixture was poured into a polymethylpentene petri dish (inner diameter 8.5 cm) and allowed to stand at 50° C. for about 2 days to evaporate the volatile solvent (methanol), whereby the crosslinking reaction proceeded. Thereafter, the sample was dried at 50° C. for about 1 day using a vacuum dryer to completely remove the volatile solvent, whereby a membrane of post-crosslinked poly(4-vinylpyridine) (post-crosslinked P4VP) was obtained.

Note that the obtained post-crosslinked P4VP membrane was not dissolved in a good solvent such as methanol and was swollen. Thus, it can be understood that this membrane was crosslinked.

The structure of the post-crosslinked P4VP is shown below.

[Chem. 6]

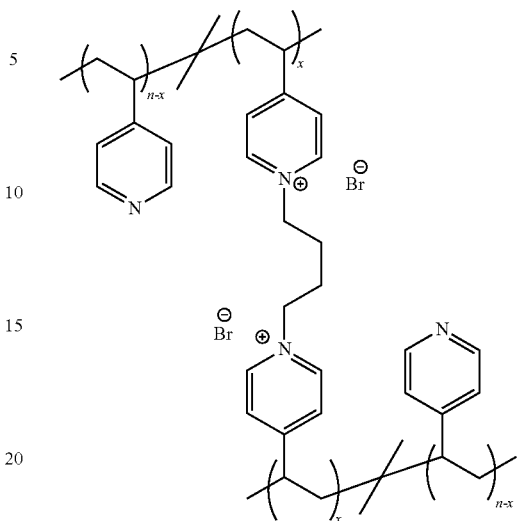

Post-Crosslinked P4VP

Example 1

In the present Example, a proton-conductive membrane was prepared using the crosslinked P4VP obtained in Synthesis Example 1 as the crosslinked polymer and concentrated sulfuric acid (pKa: −3.0) (98%) as the plasticizer. The proton conductivity thereof was evaluated.

(1) Preparation of Proton-Conductive Membrane 269 mg of concentrated sulfuric acid (98%) and 5.01 g of methanol were added to a Teflon® beaker having a 10 mL capacity and mixed to obtain a sulfuric acid-methanol solution. 57.9 mg of crosslinked P4VP was immersed in this solution and allowed to stand at 50° C. for 2 days, sulfuric acid was introduced into the crosslinked P4VP, and the methanol was removed. The membrane obtained in this manner was dried in a vacuum dryer at 50° C. for 2 days to completely remove the methanol, whereby a proton-conductive membrane was prepared.

The mass of the obtained proton-conductive membrane was 313.0 mg. Thus, it was confirmed that this membrane comprised 18 mass % (57.9 mg) of crosslinked P4VP and 82 mass % (255.1 mg) of sulfuric acid. Furthermore, the obtained proton-conductive membrane was a viscoelastic solid.

In the obtained proton-conductive membrane, the crosslinked polymer was the crosslinked P4VP comprising pyridyl groups as the proton acceptor group and the plasticizer was sulfuric acid (pKa: −3.0), which is a proton donor compound. It is believed that most of the sulfuric acid was in the form of sulfuric acid ions (anions) due to the release of protons and most of the pyridyl groups in the crosslinked P4VP received the protons from the sulfuric acid to generate pyridinium ions (cations).

(2) Evaluation of the Proton-Conductive Membrane (i) Measurement of the Glass Transition Point Differential scanning calorimetry (DSC) was performed on the obtained proton-conductive membrane in the temperature range of −90° C. to 40° C. under the conditions of a heating rate of 10° C./min in accordance with JIS K7121. As a result, the proton-conductive membrane exhibited a single glass transition point Tg of −79° C.

(ii) Unloaded Static Evaluation

The proton-conductive membrane obtained as described above was allowed to stand in an unloaded state for 1 hour while the temperature was changed and was evaluated in accordance with the following criteria.
A: The case in which neither leakage nor volatiles were observed within a temperature range of −40° C. to 150° C.
B: The case in which leakage or volatiles were confirmed at a temperature of 100° C. or higher.
C: The case in which leakage or volatiles were confirmed at a temperature of −40° C. or higher.

Regarding the unloaded leakage evaluation of the proton-conductive membrane of Example 1, leakage was not observed in the temperature range of −40° C. to 150° C. and the evaluation result was "A". It was confirmed that no plasticizer leaked in the operating temperature range of the battery. It is believed that this was due to the reception of a proton released from the sulfuric acid by the pyridyl group in the crosslinked polymer and the conversion thereof to a pyridinium ion, and the generation of ionic interaction between the pyridinium ion (cation) and the sulfuric acid ion (anion) that released the proton.

(iii) AC Impedance Measurement

AC impediment measurement of the obtained proton-conductive membrane was performed using platinum meshes having 0.1 mm thicknesses as the electrodes.

The proton-conductive membrane (thickness: 0.13 cm, width: 0.42 cm) was interposed between a pair of electrodes arranged so as to face each other with an inter-electrode spacing of 0.70 cm. The proton-conductive membrane interposed between the electrodes was placed in a natural convection-type constant-temperature drier and dried for 1 hour under the conditions of a temperature 50° C. and relative humidity 12% RH. Measurement of the relative humidity was performed using a professional temperature and humidity meter "Testo 635-2" (manufactured by Testo Corp.).

After waiting until the temperature in the dryer stabilized, AC impedance measurement was performed under non-humidified conditions by changing the frequency from $10^6$ Hz to 1 Hz at a voltage of 80 mV using a potentio/galvanostat VERSASTAT 4-400 (manufactured by Princeton Applied Research) using the FRA (frequency characteristic analysis) option and the resistance value in the frequency region in which the absolute value of the resistance value was substantially constant was read and determined to be $1.4 \times 10^2 \Omega$.

Further, the proton conductivity of the proton-conductive membrane was obtained using Expression (1) below, and was 87 mS/cm. It was confirmed that this proton-conductive membrane exhibited a high proton conductivity.

Proton Conductivity=Inter-Electrode Spacing/(Membrane Thickness×Membrane Width×Resistance Value)    (1)

Next, the measurement conditions were changed to a temperature of 80° C. and relative humidity of 3.5% RH and AC impedance measurement was performed. The resistance value in the frequency region in which the absolute value of the resistance value was substantially constant was $1.0 \times 10^2 \Omega$, the proton conductivity was 120 mS/cm, and the proton transmission rate was high.

The temperature at the time of measurement and the relative humidity were further changed, and AC impedance measurement was performed. The resistance value in the frequency region in which the absolute value of the resistance value was substantially constant and the proton conductivity were obtained. As a result, at a temperature of 95° C. and a relative humidity of 2.5% RH, the resistance value was $8.7 \times 10^1 \Omega$ and the proton conductivity was 140 mS/cm; at a temperature of 110° C. and a relative humidity of 2.0% RH, the resistance value was $8.3 \times 10^1 \Omega$ and the proton conductivity was 150 mS/cm; and at a temperature of 120° C. and a relative humidity of 1.8% RH, the resistance value was $7.8 \times 10^1 \Omega$ and the proton conductivity was 160 mS/cm. Under all of these measurement conditions, the proton conductivity was a high value.

Regarding the proton-conductive membrane of the present Example, during the AC impedance measurement, no leakage was observed, the membrane form was maintained without flowing, and the proton-conductive membrane was a viscoelastic solid.

Examples 2 and 3, and Comparative Example 1

Proton-conductive membranes were prepared and evaluated in the same manner as Example 1 except that the usage amounts of the crosslinked polymer and the plasticizer were changed as shown in Table 2 below. The evaluation results are shown in Table 2 below.

Example 4

In the present Example, a proton-conductive membrane was prepared using the crosslinked P4VP obtained in Synthesis Example 1 as the crosslinked polymer and phosphoric acid (pKa: 2.1) (85%) as the plasticizer, and the membrane was evaluated.

(1) Preparation of Proton-Conductive Membrane 112 mg of phosphoric acid (85%) and 5.01 g of methanol were added to a Teflon® beaker having a 10 mL capacity and mixed to obtain a phosphoric acid-methanol solution. 23.6 mg of crosslinked P4VP was immersed in this solution and allowed to stand at 50° C. for 2 days, phosphoric acid was introduced into the crosslinked P4VP, and the methanol was removed. The membrane obtained in this manner was dried in a vacuum dryer at 50° C. for 2 days to completely remove the methanol, whereby a proton-conductive membrane was prepared.

The mass of the obtained proton-conductive membrane was 119.0 mg. Thus, it was confirmed that this membrane comprised 20 mass % (23.6 mg) of crosslinked P4VP and 80 mass % (95.4 mg) of phosphoric acid. Furthermore, the obtained proton-conductive membrane was a viscoelastic solid.

In the obtained proton-conductive membrane, the crosslinked polymer was the crosslinked P4VP comprising pyridyl groups as the proton acceptor group and the plasticizer was phosphoric acid (pKa: 2.1), which is a proton donor compound. It is believed that part of the phosphoric acid was in the form of phosphoric acid ions (anions) due to the release of protons and the pyridyl groups in the crosslinked P4VP received the protons from the phosphoric acid to generate pyridinium ions (cations).

(2) Evaluation of the Proton-Conductive Membrane

The obtained proton-conductive membrane was evaluated in the same manner as Example 1. The evaluation results are shown in Table 2 below.

Comparative Example 2

In Comparative Example 2, a proton-conductive membrane was prepared using the crosslinked MT obtained in Synthesis Example 1 as the crosslinked polymer and isopropyl malonic acid (IPMA) (pKa: 2.9) as the plasticizer, and the membrane was evaluated.

(1) Preparation of Proton-Conductive Membrane 49 mg of IPMA and 5.01 g of methanol were added to a Teflon® beaker having a 10 mL capacity and mixed to obtain an IPMA-methanol solution. 37.4 mg of crosslinked P4VP was immersed in this solution and allowed to stand at 50° C. for 2 days, IPMA was introduced into the crosslinked P4VP, and the methanol was removed. The membrane obtained in this manner was dried in a vacuum dryer at 50° C. for 2 days to completely remove the methanol, whereby a proton-conductive membrane was prepared.

The mass of the obtained proton-conductive membrane was 186.0 mg. Thus, it was confirmed that this membrane comprised 20 mass % (37.4 mg) of crosslinked P4VP and 80 mass % (148.6 mg) of IPMA. Furthermore, the obtained proton-conductive membrane was a viscoelastic solid.

In the obtained proton-conductive membrane, the crosslinked polymer was the crosslinked P4VP comprising pyridyl groups as the proton acceptor group and the plasticizer was IPMA (pKa: 2.9), which is a proton donor compound. It is believed that part of the carboxyl groups in the IPMA were in the form of carboxylate ions (anions) due to the release of protons and the pyridyl groups of the crosslinked. P4VP received the protons from the IPMA to generate pyridinium ions (cations).

(2) Evaluation of the Proton-Conductive Membrane

The obtained proton-conductive membrane was evaluated in the same manner as Example 1.

In Comparative Example 2, when the temperature in the unloaded static evaluation was 100° C. or higher, the odor of the IPMA began to diffuse in the vicinity of the proton-conductive membrane. As a result, it was understood that the plasticizer evaporated in the temperature region of at least 100° C. or higher. Thus, AC impedance measurement was performed at 50° C., 80° C., and 95° C. Measurements at 110° C. and 120° C. were not performed. The evaluation results are shown in Table 2 below.

Comparative Example 3

In Comparative Example 3, preparation of a proton-conductive membrane was attempted using the non-crosslinked P4VP obtained in Synthesis Example 2 in place of the crosslinked P4VP obtained in Synthesis Example 1 and sulfuric acid (pKa: −3.0) (98%) as the plasticizer.

32.8 mg of P4VP, 133 mg of sulfuric acid (98%), and 4.16 g of methanol were added to a Teflon® beaker having a 10 mL capacity and mixed to prepare a mixed solution. This solution was allowed to stand on a 50° C. hotplate for 2 days to remove the methanol. Thereafter, the residue remaining after the methanol was removed was dried in a vacuum dryer at 50° C. for 2 days to completely remove the methanol, whereby the sample of Comparative Example 3 was obtained.

The obtained sample was flowable and did not have a membrane form. It is believed that this is a result of the non-crosslinking of the polymer, whereby a membrane form could not be maintained.

Thus, evaluation of the sarrrple obtained in this Comparative Example could not be performed.

Example 5

In the present Example, a proton-conductive membrane was prepared using the crosslinked PVIm obtained in Synthesis Example 3 as the crosslinked polymer and sulfuric acid (pKa: −3.0) (98%) as the plasticizer, and the membrane was evaluated.

1) Preparation of Proton-Conductive Membrane 166 mg of sulfuric acid (98%) and 5.10 g of methanol were added to a Teflon® beaker having a 10 mL capacity and mixed to obtain a sulfuric acid-methanol solution. 39.8 mg of solid crosslinked PVIm was immersed in this solution and allowed to stand at 50° C., for 2 days, sulfuric acid was introduced into the crosslinked PVIm, and the methanol was removed. The membrane obtained in this manner was dried in a vacuum dryer at 50° C. for 2 days to completely remove the methanol, whereby a proton-conductive membrane was prepared.

The mass of the obtained proton-conductive membrane was 203.0 mg. Thus, it was confirmed that this membrane comprised 20 mass % (39.8 mg) of crosslinked PVIm and 80 mass % (163.2 mg) of sulfiric acid. Furthermore, the obtained proton-conductive membrane was a viscoelastic solid.

In the obtained proton-conductive membrane, the crosslinked polymer was the crosslinked PVIm comprising imidazolyl groups as the proton acceptor group and the plasticizer was sulfuric acid (pKa: −3.0), which is a proton donor compound. It is believed that the sulfuric acid was in the form of sulfuric acid ions (anions) due to the release of protons and the imidazolyl groups in the crosslinked PVIm received the protons from the sulfuric acid to generate imidazolium ions (cations).

(2) Evaluation of the Proton-Conductive Membrane

The obtained proton-conductive membrane was evaluated in the same manner as Example 1. The evaluation results are shown in Table 2 below.

Example 6

In Example 6, a proton-conductive membrane was prepared using the crosslinked P(4VP-co-S) obtained in Synthesis Example 4 as the crosslinked polymer and concentrated sulfuric acid (pKa: −3.0) (98%) as the plasticizer, and the membrane was evaluated.

(1) Preparation of Proton-Conductive Membrane 194 mg of concentrated sulfuric acid (98%) and 4.27 g of methanol were added to a Teflon® beaker having a 10 mL capacity. 48.6 mg of the aforementioned crosslinked P(4VP-co-S) was immersed in this solution, allowed to stand on a 50° C. hotplate for 2 days to remove the methanol, and was then dried in a vacuum dryer at 50° C. for about 2 days to completely remove the methanol, whereby a proton-conductive membrane was prepared.

The mass of the obtained proton-conductive membrane was 237 mg. Thus, it was confirmed that this membrane comprised 20 mass % of crosslinked P(4VP-co-S) and 80 mass % of sulfuric acid. Furthermore, the obtained proton-conductive membrane was a viscoelastic solid.

In the obtained proton-conductive membrane, the crosslinked polymer was the crosslinked P(4VP-co-S) comprising pyridyl groups as the proton acceptor group and the plasticizer was sulfuric acid (pKa: −3.0), which is a proton donor compound. It is believed that the sulfuric acid was in the form of sulfuric acid ions (anions) due to the release of protons and the pyridyl groups of the crosslinked P(4VP-co-S) received the protons from the sulfuric acid to generate pyridinium ions (cations).

(2) Evaluation of the Proton-Conductive Membrane

The obtained proton-conductive membrane was evaluated in the same manner as Example 1. Note that the proton conductivity was evaluated at 110° C. and 120° C. The evaluation results are shown in Table 2 below.

Example 7

In the present example, a proton-conductive membrane was prepared using the crosslinked P(4VP-co-S) obtained in Synthesis Example 5 as the crosslinked polymer and sulfuric acid (pKa.: −3.0) (98%) as the plasticizer, and the membrane was evaluated.

(1) Preparation of Proton-Conductive Membrane

A proton-conductive membrane was prepared in the same manners as Example 6 except that 195 mg of concentrated sulfuric acid (98%), 4.21 g of methanol, and 48.7 mg of solids of the crosslinked P(4VP-co-S) obtained in Synthesis Example 5 were used.

The mass of the obtained proton-conductive membrane was 241 mg. Thus, it was confirmed that this membrane comprised 20 mass % of crosslinked P(4VP-co-S) and 80 mass % of sulfuric acid. Furthermore, the obtained proton-conductive membrane was a viscoelastic solid.

(2) Evaluation of the Proton-Conductive Membrane

The obtained proton-conductive membrane was evaluated in the same manner as Example 1. Note that the proton conductivity was evaluated at 110° C. and 120° C. The evaluation results are shown in Table 2 below.

Example 8

In the present example, a proton-conductive membrane was prepared using the crosslinked P(4VP-co-S) obtained in Synthesis Example 6 as the crosslinked polymer and sulfuric acid (pKa: −3.0) (98%) as the plasticizer, and the membrane was evaluated.

(1) Preparation of Proton-Conductive Membrane

A proton-conductive membrane was prepared in the same manners as Example 6 except that 121 mg of concentrated sulfuric acid (98%), 4.07 g of methanol, and 30.0 mg of solids of the crosslinked P(4VP-co-S) obtained in Synthesis Example 6 were used.

The mass of the obtained proton-conductive membrane was 147 mg. Thus, it was confirmed that this membrane comprised 20 mass % of crosslinked P(4VP-co-S) and 80 mass % of sulfuric acid. Furthermore, the obtained proton-conductive membrane was a viscoelastic solid.

(2) Evaluation of the Proton-Conductive Membrane

The Obtained proton-conductive membrane was evaluated in the same manner as Example 1. Note that the proton conductivity was evaluated at 110° C. and 120° C. The evaluation results are shown in Table 2 below.

Comparative Example 4

In Comparative Example 4, preparation of a proton-conductive membrane was attempted using the crosslinked PS comprising substantially no nitrogen heterocycle repeating units obtained in Synthesis Example 7 (Comparative Synthesis Example) as the crosslinked polymer and concentrated sulfuric acid (pKa: −3.0) (98%) as the plasticizer.

(1) Preparation of Proton-Conductive Membrane 164 mg of concentrated sulfuric acid (98%) and 4.77 g of THF were added to a Teflon® beaker having a 10 mL capacity and 41.3 mg of solids of the crosslinked PS obtained in Synthesis Example 7 (Comparative Synthesis Example) was immersed in this solution. Thereafter, this solution was allowed to stand on a 50° C. hotplate for about 2 days and it was attempted to introduce sulfuric acid into the crosslinked PS to remove the THF. Though the THF evaporated, the sulfuric acid was not substantially absorbed by the crosslinked PS and the sulfuric acid and crosslinked PS separated, whereby a proton-conductive membrane could not be obtained.

It is believed that the sulfuric acid was not absorbed by the crosslinked PS because the crosslinked PS had substantially no proton acceptor groups in the repeating units thereof, and as a result, did not have affinity with sulfuric acid.

Example 9

In Example 9, a proton-conductive membrane was prepared using the post-crosslinked P4VP obtained in Synthesis Example 8 as the crosslinked polymer and concentrated sulfuric acid (pKa: −3.0) (98%) as the plasticizer, and the membrane was evaluated.

(1) Preparation of Proton-Conductive Membrane

A solution in which 554 mg of concentrated sulfuric acid (98%) was dissolved in 5.78 g of methanol was poured into a Teflon® container (inner diameter 4 cm), 136 mg of the post-crosslinked P4VP was immersed in this solution, subsequently allowed to stand at 50° C. for about 2 days to evaporate volatile solvent (methanol). Thereafter, the solution was dried in a vacuum dryer at 50° C. for about 1 day to completely remove the volatile solvent, whereby 670 tug of a sample in which the post-crosslinked P4VP was swollen with $H_2SO_4$ was obtained. The weight concentration of $H_2SO_4$ was 80 mass %.

The membrane thickness of the obtained proton-conductive membrane was 0.35 mm. Furthermore, the proton-conductive membrane was a viscoelastic solid.

(2) Evaluation of the Proton-Conductive Membrane

The proton conductivity of the obtained proton-conductive membrane was evaluated in the same manner as Example 1. The evaluation results of the proton conductivity are shown in Table 2 below.

(3) Tensile Evaluation

Figure 2:
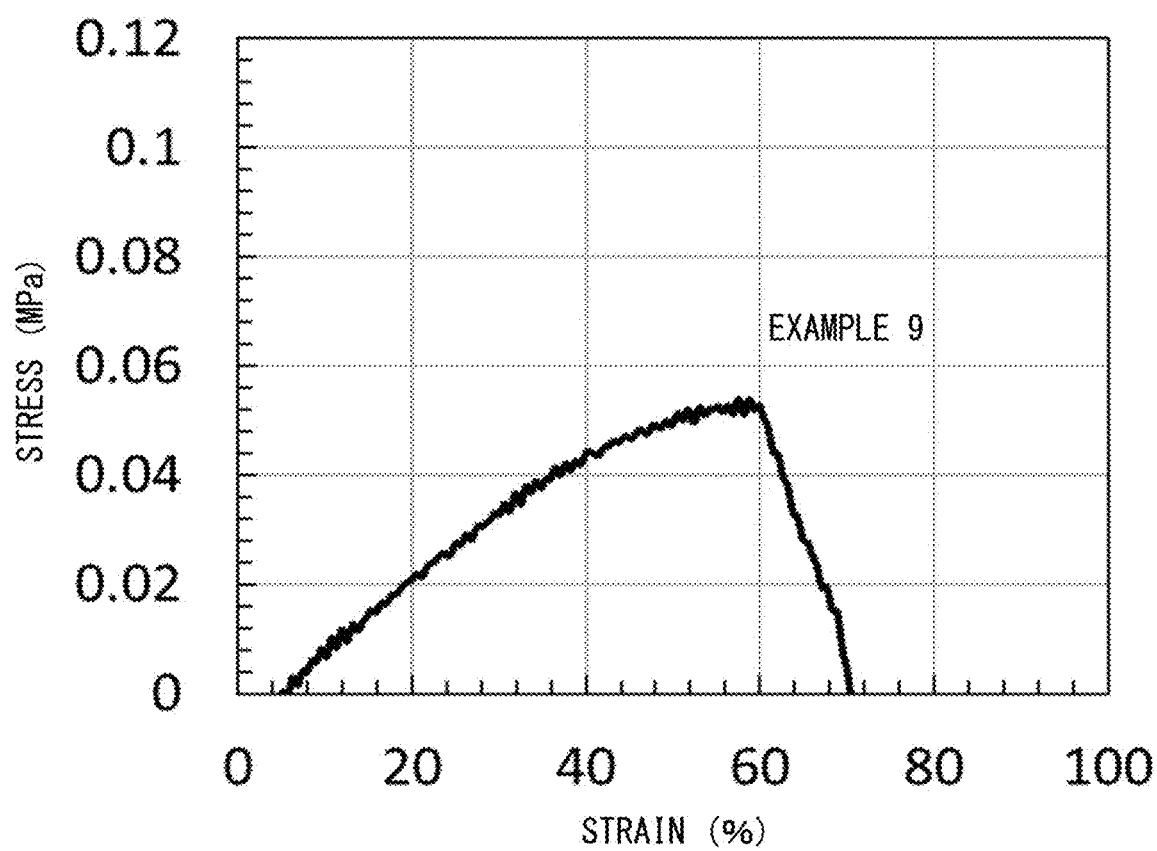
FIG. 2 is a view showing the stress-strain curve obtained from the tensile evaluation of Example 9.

The obtained membrane-shaped sample was punched out with a punching blade, and a 4-mm width dog bone-type test piece was prepared. The measurement device used was a tensile tester having an AGS-X, 50N load cell manufactured by Shimadzu Corp., a 50N clip type grip tool, and the tensile evaluation was performed at a distance between the jaws of 5.9 mm and an initial strain rate of 0.33/s (pulling speed 1.9 mm/s) evaluation. FIG. 2 shows the stress-strain curve, which is the result of tensile evaluation.

In Example 9, the results of the obtained Young's modulus, maximum stress, elongation at break, and internal area value of the stress-strain curve (indicator of the durability of the material) were 0.10 MPa., 0.054 MPa, 60%, and 0.021 $MJ/m^3$, respectively.

Note that the Young's modulus was obtained from the initial gradient of the stress-strain curve (strain is within 10%), the maximum stress was obtained from the maximum value of the stress, and the elongation at break was obtained from the elongation at the occurrence of breakage.

From the results of the tensile evaluation of the obtained proton-conductive membrane of Example 9, it was understood that the proton-conductive membrane of Example 9 was a flexible solid membrane.

TABLE 1

| | First Monomer (Proton Acceptor) | | Second Monomer (Crosslinkable) | | Third Monomer (Non-Proton Acceptor and Non-Crosslinkable) | | Proportion*1 of First Monomer (Proton Acceptor) |
|---|---|---|---|---|---|---|---|
| | Type | Mass Ratio | Type | Mass Ratio | Type | Mass Ratio | (Mass %) |
| Synthesis Example 1 | Crosslinked P4VP | 4VP 1000 | MBAA | 25 | — | — | 97.6 |
| Synthesis Example 2 (Comparative) | Non-Crosslinked P4VP | 4VP 100 | — | — | — | — | — |
| Synthesis Example 3 | Crosslinked PVIm | VIm 1000 | MBAA | 25 | — | — | 97.6 |
| Synthesis Example 4 | Crosslinked P(4VP-co-S) | 4VP 600 | MBAA | 23 | S | 300 | 65.0 |
| Synthesis Example 5 | Crosslinked P(4VP-co-S) | 4VP 420 | MBAA | 21 | S | 410 | 49.4 |
| Synthesis Example 6 | Crosslinked P(4VP-co-S) | 4VP 340 | MBAA | 25 | S | 680 | 32.5 |
| Synthesis Example 7 (Comparative) | Crosslinked PS | — — | MBAA | 23 | S | 920 | 0.0 |
| Synthesis Example 8 | Post-Crosslinked P4VP | 4VP 100 | 1,4-dibromobutane (Crosslinking Agent) | — | — | — | — |

4VP: 4-vinylpyridine
MBAA: N,N'-methylene bisacrylamide
VIm: 1-vinylimidizole
S: Styrene
*1Proportion (mass %) of the first monomer when the total of the crosslinked polymer constituting the monomer is 100 mass %.

TABLE 2

| | Polymer | | Plasticizer | | Proton-Conductive Membrane Form | Glass Transition Point*1 (° C.) | Unloaded Static Evaluation |
|---|---|---|---|---|---|---|---|
| | Type | Content Ratio (Mass %) | Type | Content Ratio (Mass %) | | | |
| Example 1 | Crosslinked P4VP (Synthesis Example 1) | 18 | Sulfuric Acid | 82 | Viscoelastic Solid | −79 | A |
| Example 2 | Crosslinked P4VP (Synthesis Example 1) | 29 | Sulfuric Acid | 71 | Viscoelastic Solid | — | A |
| Example 3 | Crosslinked P4VP (Synthesis Example 1) | 40 | Sulfuric Acid | 60 | Viscoelastic Solid | — | A |
| Comparative Example 1 | Crosslinked P4VP (Synthesis Example 1) | 45 | Sulfuric Acid | 55 | Glass-like Solid | — | A |
| Example 4 | Crosslinked P4VP (Synthesis Example 1) | 20 | Phosphoric Acid | 80 | Viscoelastic Solid | −30 | A |
| Comparative Example 2 | Crosslinked P4VP (Synthesis Example 1) | 20 | IPMA | 80 | Viscoelastic Solid | −36 | B |
| Comparative Example 3 | Non-Crosslinked P4VP (Synthesis Example 2) | — | Sulfuric Acid | — | Flow | — | — |
| Example 5 | Crosslinked PVIm (Synthesis Example 3) | 20 | Sulfuric Acid | 80 | Viscoelastic Solid | — | A |
| Example 6 | Crosslinked P(4VP-co-S) (Synthesis Example 4) | 20 | Sulfuric Acid | 80 | Viscoelastic Solid | — | A |
| Example 7 | Crosslinked P(4VP-co-S) (Synthesis Example 5) | 20 | Sulfuric Acid | 80 | Viscoelastic Solid | — | A |
| Example 8 | Crosslinked P(4VP-co-S) (Synthesis Example 6) | 20 | Sulfuric Acid | 80 | Viscoelastic Solid | — | A |
| Comparative Example 4 | Crosslinked PS (Synthesis Example 7) | — | Sulfuric Acid | — | — | — | — |
| Example 9 | Post-Crosslinked P4VP (Synthesis Example 8) | 20 | Sulfuric Acid | 80 | Viscoelastic Solid | — | A |

| | Proton Conductivity (mS/cm) | | | | | Membrane Form |
|---|---|---|---|---|---|---|
| | 50° C. | 80° C. | 95° C. | 110° C. | 120° C. | |
| Example 1 | 87 | 120 | 140 | 150 | 160 | Retained |
| Example 2 | 54 | 62 | 56 | 54 | 59 | Retained |
| Example 3 | 7.4 | 13 | 15 | 18 | 19 | Retained |

TABLE 2-continued

| | | | | | | |
|---|---|---|---|---|---|---|
| Comparative Example 1 | 0.022 | 0.077 | 0.11 | 0.14 | 0.15 | Retained |
| Example 4 | 14 | 24 | 32 | 41 | 47 | Retained |
| Comparative Example 2 | 0.0045 | 0.028 | 0.041 | (Volatile) | | Retained |
| Comparative Example 3 | (Not Measurable) | | | | | |
| Example 5 | 130 | 140 | 130 | 110 | 170 | Retained |
| Example 6 | — | — | — | 160 | 170 | Retained |
| Example 7 | — | — | — | 190 | 190 | Retained |
| Example 8 | — | — | — | 200 | 200 | Retained |
| Comparative Example 4 | (Not Measurable) | | | | | |
| Example 9 | 99 | 140 | 160 | 190 | 210 | Retained |

*[1]A "—" in the Glass Transition Point column indicates that measurement was not performed.

As shown in Tables 1 and 2, the proton-conductive membranes of Examples 1 to 9, i.e., proton-conductive membranes which were viscoelastic solids and which comprised crosslinked polymers including substantial proportions of proton acceptor groups and suitable plasticizers, which are proton donors, exhibited no leakage or volatiles in the temperature range of −40° C. to 150° C. and had good proton conductivities.

Conversely, the proton-conductive membrane of Comparative Example 1, i.e., a proton-conductive membrane comprising a crosslinked polymer including a substantial proportion of proton acceptor groups and a suitable proton donor plasticizer, and which was a glass-like solid, rather than a viscoelastic solid, due to a low plasticizer content ratio, had low proton conductivity.

The proton-conductive membrane of Comparative Example 2, i.e., a proton-conductive membrane comprising a crosslinked polymer including a substantial proportion of proton acceptor groups and a proton donor plasticizer, in which the pKa of the plasticizer was too high, had a low proton conductivity.

In Comparative Example 3, though formation of a proton-conductive membrane was attempted using a polymer comprising a substantial proportion of proton acceptor groups and a proton donor plasticizer, since this polymer was a non-crosslinked polymer, the material exhibited flowability and could not be formed into a membrane.

In Comparative Example 4, though formation of a proton-conductive membrane was attempted using a crosslinked polymer and a proton donor plasticizer, since this crosslinked polymer had substantially no proton acceptor groups, the proton donor plasticizer could not be absorbed by the polymer, and thus, a proton-conductive membrane could not be obtained.

Note that in Examples 6 to 8 (Synthesis Examples 4 to 6), in which the proportion of the first monomer comprising proton acceptor groups was changed, as the proportion of the first monomer decreased from 65.0 mol % to 32.5 mol %, it appears that the free proton concentration in the membrane increased, and as a result, it is believed that the proton conductivity increased to about 200 mS/cm.

Reference Example 1

In Reference Example 1, the change trend of the glass transition point (Tg) when the molar ratio of the proton donor compound (sulfuric acid) to the proton acceptor groups (pyridyl groups) changed was studied.

The non-crosslinked polymer (non-crosslinked P4VP) of Synthesis Example 2 described above was used as the polymer comprising proton acceptor groups (pyridyl groups) of Reference Example 1.

The above non-crosslinked P4VP and concentrated sulfuric acid (pKa: −3.0) (98%) were mixed at different molar ratios and the glass transition points thereof were measured. The results are shown in Table 3 and FIG. 3.

TABLE 3

| Sulfuric Acid Mass %*[1] | Molar Ratio of Sulfuric Acid to Pyridyl Groups*[2] | Tg*[3] (° C.) |
|---|---|---|
| 0 | 0.00 | 152*[4] |
| 10 | 0.12 | 141 |
| 20 | 0.27 | 158 |
| 30 | 0.46 | 170 |
| 40 | 0.71 | 171 |
| 50 | 1.07 | 141 |
| 55 | 1.31 | 43 |
| 60 | 1.61 | −52 |
| 70 | 2.50 | −86 |
| 80 | 4.29 | Less than −95 |

*[1]"Sulfuric Acid Mass %" is the value of the mass % of the sulfuric acid when the total of the mixture of the non-crosslinked P4VP and sulfuric acid is 100 mass %
*[2]"Molar Ratio of Sulfuric Acid to Pyridyl Groups" is the value calculated from (number of moles of sulfuric acid/number of moles of pyridyl groups).
*[3]"Tg" is the glass transition point of the mixture of the non-crosslinked P4VP and the sulfuric acid.
*[4]This value is the Tg when sulfuric acid was not included, i.e., the Tg value of the non-crosslinked P4VP itself.

Figure 3:
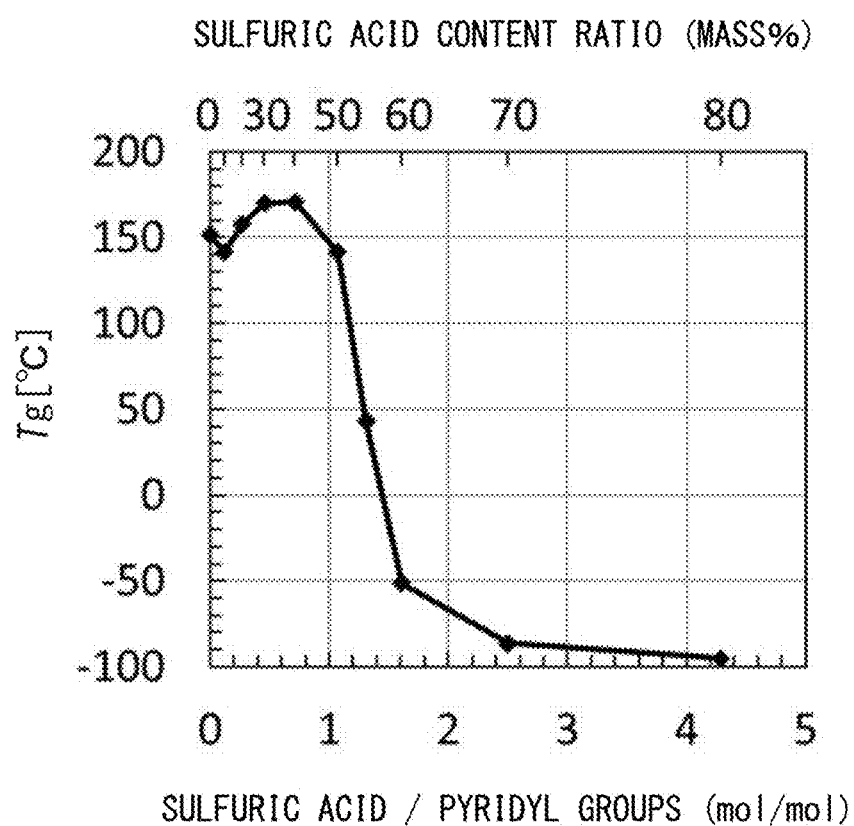
FIG. 3 is a view showing, for the polymer of Reference Example 1, the change tendency of the glass transition point when the molar ratio of the proton donor compound to the proton acceptor group varies.

As shown in Table 3 and FIG. 3, when the molar ratio of sulfuric acid to pyridyl groups was 0.12 to 0.71, the Tg of the mixture of the non-crosslinked P4VP and sulfuric acid tended to be higher than the Tg of the non-crosslinked P4VP itself. It is believed that this was because most of the sulfuric acid formed an acid-base complex, in which segment movement with the pyridyl groups of the non-crosslinked P4VP is unlikely to occur.

Conversely, when the molar ratio of sulfuric acid to pyridyl groups began to exceed 1, for example, from the time when the molar ratio of sulfuric acid to pyridyl groups was 1.1, the Tg of the mixture of non-crosslinked P4VP and sulfuric acid tended to decrease greatly. It is believed that this was because when the molar ratio of sulfuric acid to pyridyl groups exceeded 1, the sulfuric acid functioned as a plasticizer and caused segment movement of polymer chains.

Note that the results obtained above depended on the number of moles of sulfuric acid itself, not the number of moles of protons contained in sulfuric acid. It is believed that the above results are applicable to all proton donor compounds.

Reference Example 2

In Reference Example 2, the change trend of the proton conductivity of the proton-conductive membrane at 120° C.

when the molar ratio of proton donor compound (sulfuric acid) to proton acceptor groups (pyridyl groups) changed was studied.

In Reference Example 2, a proton-conductive membrane was prepared in the same manner as Example 9 except that the crosslinked P4VP obtained in Synthesis Example 1 described above was used, concentrated sulfuric acid (pKa: −3.0) (98%) was used as the plasticizer, and the content of the sulfuric acid was changed. The results are shown in FIG. 4.

Figure 4:
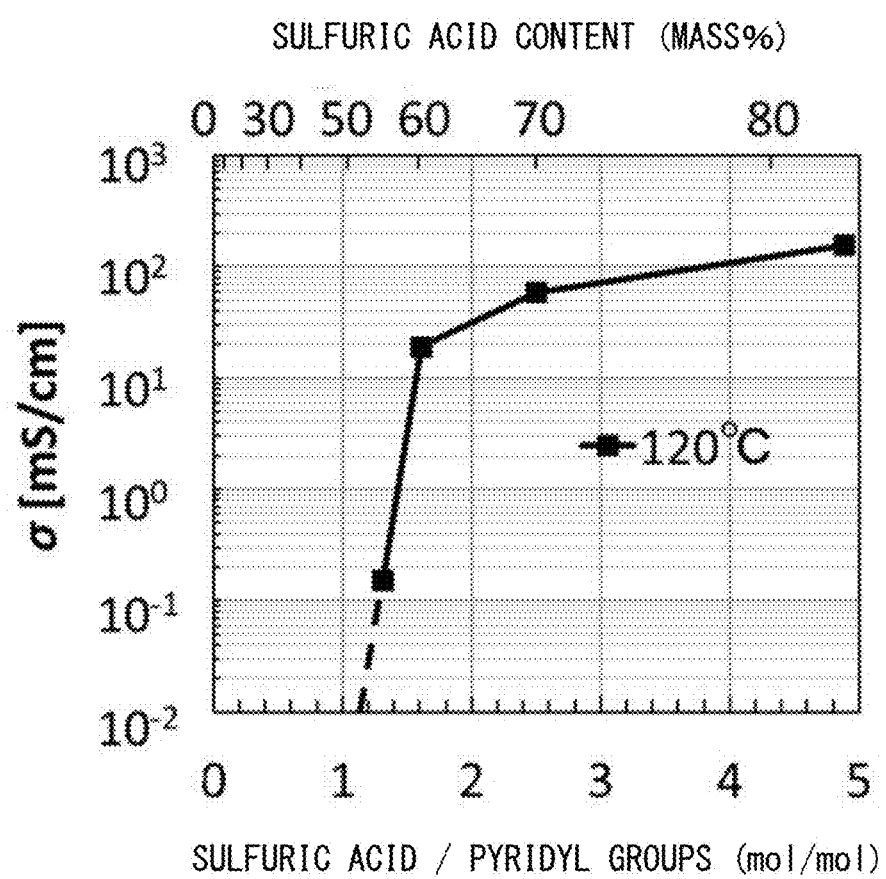
FIG. 4 is a view showing, for the polymer of Reference Example 2, the change tendency of the proton conductivity when the molar ratio of the proton donor compound to the proton acceptor group varies.

As shown in FIG. 4, when the molar ratio of sulfuric acid to pyridyl groups was less than 1.1 (sulfuric acid content of 50 mass %), since the resistance thereof was high, the proton conductivity could not be estimated using impedance measurement (indicated by the dashed line).

Conversely, when the molar ratio of sulfuric acid to pyridyl groups was 1.3 (sulfuric acid content of 55 mass %) to 1.6 (sulfuric acid content of 60 mass %), as the molar ratio value increased, the proton conductivity was found to have increased by 2 to 3 orders of magnitude. It is believed that this sharp increase in proton conductivity was due to an increase in the concentration of free protons derived from excess amounts of sulfuric acid which was not used for acid-base complex formation.

From the results of Reference Examples 1 and 2 above, in the case in which the proton donor compound is impregnated into the crosslinked polymer having proton acceptor groups in the side chain thereof, it was found that when the proton donor compound is contained in an amount greater than the number of moles of the proton acceptor groups, the glass transition point rapidly decreased and the proton conductivity under no humidification rapidly increased.

The invention claimed is:

1. A proton-conductive membrane, comprising:
    a crosslinked polymer and a plasticizer,
    wherein the crosslinked polymer includes a proton acceptor group in an amount equal to 10 mol % or more of repeating units constituting the crosslinked polymer,
    wherein the crosslinked polymer is a copolymer of a first monomer, which is a vinyl-based monomer including a proton acceptor group, and a second monomer, which is a crosslinkable vinyl monomer,
    wherein the plasticizer includes a proton donor compound having a pKa value 2.5 or less, and
    wherein the proton-conductive membrane is a viscoelastic solid in a temperature range of 50° C. to 120° C.

2. The proton-conductive membrane according to claim 1, wherein when the total of the crosslinked polymer and the plasticizer is 100 parts by mass, the content of the plasticizer is 60 parts by mass to 90 parts by mass.

3. The proton-conductive membrane according to claim 1, wherein the proton donor compound is one or more selected from sulfuric acid and phosphoric acid.

4. The proton-conductive membrane according to claim 1, wherein the proton acceptor group is a nitrogen-containing heterocyclic group.

5. The proton-conductive membrane according to claim 1, wherein the glass transition point of the proton-conductive membrane is 30° C. or less.

6. The proton-conductive membrane according to claim 1, wherein the proton conductivity of the proton-conductive membrane is 7.4 mS/cm or more at 50° C.

7. The proton-conductive membrane according to claim 1, wherein the molar ratio of the proton donor compound to the proton acceptor group is in a range of 1.0 to 10.0.

8. A fuel cell comprising the proton-conductive membrane according to claim 1.

9. A method for the production of the proton-conductive membrane according to claim 1 comprising a crosslinked polymer and a plasticizer,
    wherein the crosslinked polymer is a copolymer of a first monomer, which is a vinyl-based monomer including a proton acceptor group, and a second monomer, which is a crosslinkable vinyl monomer,
    wherein the crosslinked polymer includes a proton acceptor group in an amount equal to 10 mol % or more of repeating units constituting the crosslinked polymer,
    wherein the plasticizer includes a proton donor compound having a pKa value of 2.5 or less,
    wherein the proton-conductive membrane is a viscoelastic solid in a temperature range of 50° C. to 120° C., and
    wherein the method comprises: polymerizing and crosslinking a first monomer, which is a vinyl-based monomer including a proton acceptor group, and a second monomer, which is a crosslinkable vinyl monomer, to obtain the crosslinked polymer.

* * * * *